S. P. & J. WENTZ.
Animal-Traps.
No. 155,777.
2 Sheets--Sheet 1.
Patented Oct. 6, 1874.
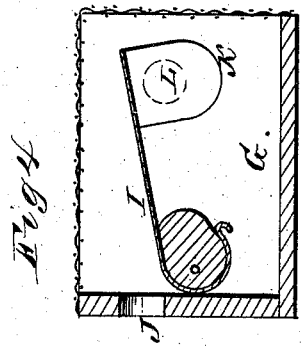
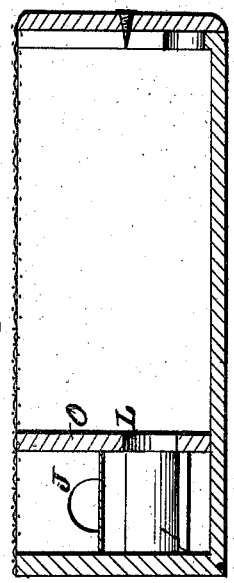
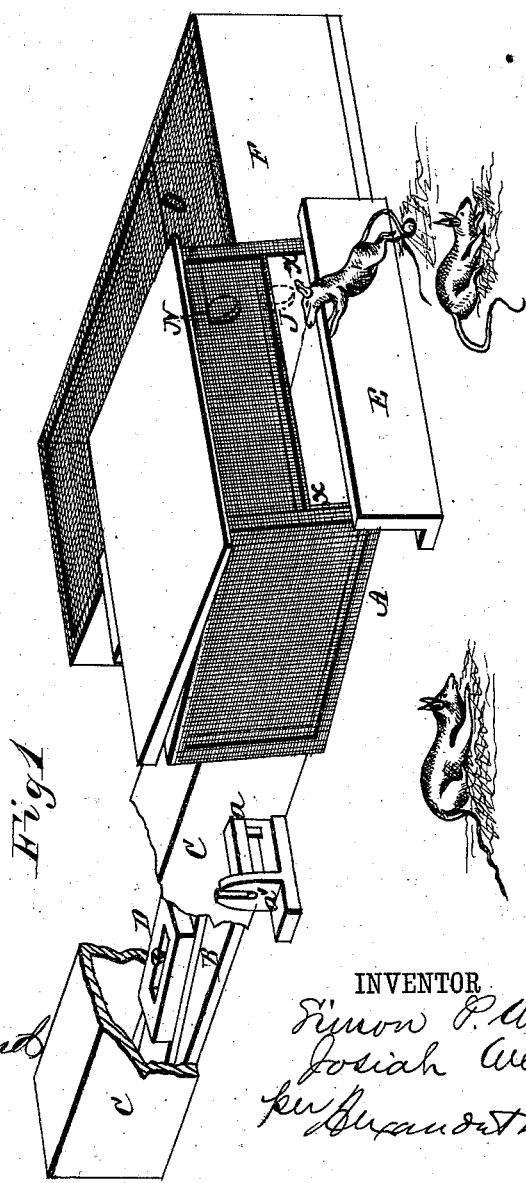
WITNESSES
Franck L. Durand
C. L. Evert.
INVENTOR
Simon P. Wentz
Josiah Wentz,
per Alexander Mator
Attorneys S. P. & J. WENTZ.
Animal-Traps.
No. 155,777.
2 Sheets--Sheet 2.
Patented Oct. 6, 1874.
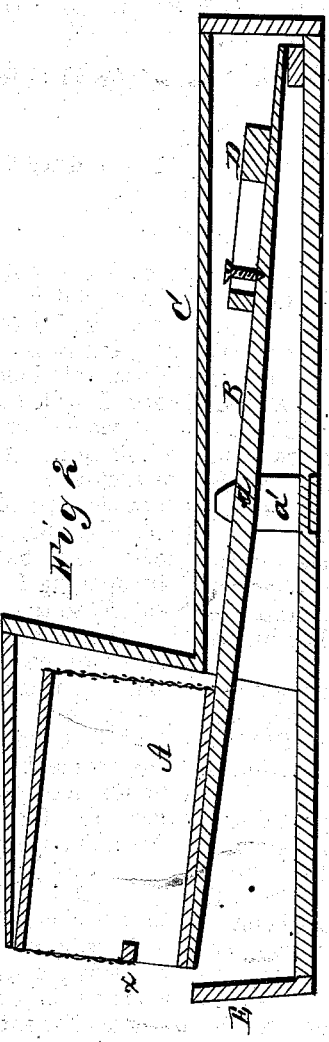
WITNESSES
Franck L. Durand
C. L. Evert
INVENTOR
Simon P. Wentz,
Josiah Wentz,
per Alexander Mann
Attorneys

UNITED STATES PATENT OFFICE

SIMON P. WENTZ AND JOSIAH WENTZ, OF COBURN'S STORE, N. C.

IMPROVEMENT IN ANIMAL-TRAPS.

Specification forming part of Letters Patent No. 155,777, dated October 6, 1874; application filed July 8, 1874.

*To all whom it may concern:*

Be it known that we, SIMON P. WENTZ and JOSIAH WENTZ, of Coburn's Store, in the county of Union and in the State of North Carolina, have invented certain new and useful Improvements in Animal-Trap; and do hereby declare that the following is a full, clear, and exact description thereof, reference being had to the accompanying drawings and to the letters of reference marked thereon, making a part of this specification.

The nature of my invention consists in the peculiar construction of two traps together, so that one will receive and the other retain the animals caught, as will be hereinafter described.

In the annexed drawings, Figure 1 is a perspective view of the two traps combined, and Figs. 3 and 4 views of one of them in different sections. Fig. 2 is a longitudinal section of one trap.

In the figures, A represents an animal-trap of any suitable construction, having most of its sides covered, as usual, with gauze wire. This trap is secured to the end of a lever, B, at the other end of said lever there being a counterpoise-weight, D, said weight being adjustable, so that the trap end of the lever may be made to rise or fall, according to the weight of animal entering it. *a* represents the fulcrum of the lever B, and *a'* the bearing for said fulcrum. C is simply a covering, which incloses the lever and weight. From *x* to *x*, at the face of the trap, there is a doorway, which is closed by the stationary door E when the trap falls. F represents the second or supplementary trap. The two traps are placed side by side, and communicate, by means of holes in each through their adjacent sides. The trap F is stationary, and the communication is made when the trap H falls, so that the opening in its side will correspond with the opening in the side of trap F. J represents the opening to trap F. The weight D is so arranged that when a mouse or rat enters the doorway at *x* the trap A drops, so that said doorway is closed by the door E. The opening N descends to the opening J in trap F. The animal, not seeing any other egress, passes into hole J and upon a balanced platform, I, which is placed between a partition, O, and the end of the trap. The partition O has a hole in it, which leads into the trap proper, as seen at L. When the platform I drops, so that the animal can enter hole L, it passes into trap F proper, and is there retained. The platform I is so balanced that it will rise and close the opening L the moment the animal enters trap F, so that it cannot retrace its steps.

This is a self-setting trap, and as many animals may be caught at one time as can be retained in the auxiliary trap F.

The weight of the animal carries down trap A until communication is opened with trap F. The moment the animal leaves trap A and stands upon platform I of trap F, trap A rises and cuts off all communication between them. The animal then passes up platform I, which drops with his weight and opens communication with trap F proper through hole L. The animal passes in, the platform I rises, and he is there securely entrapped.

Having thus fully described our invention, what we claim as new, and desire to secure by Letters Patent, is—

1. The trap A, secured to one end of a lever and regulated by a weight at the other, in combination with a stationary trap, F, as and for the purpose herein set forth.

2. The weight D, adjustable on the lever B, carrying the trap A, as and for the purpose set forth.

In testimony that we claim the foregoing we have hereunto set our hands this 17th day of June, 1874.

SIMON P. WENTZ.
JOSIAH WENTZ.

Witnesses:
J. B. BECKHAM,
M. T. HILL.